(12) United States Patent
Kwon

(10) Patent No.: US 6,675,079 B2
(45) Date of Patent: Jan. 6, 2004

(54) FAULT DIAGNOSIS METHOD FOR AN INPUT SHAFT SPEED SENSOR OF AN AUTOMATIC TRANSMISSION

(75) Inventor: Hyuk-Bin Kwon, Kunpo (KR)

(73) Assignee: Hyundai Motor Company, Seoul (KR)

( * ) Notice: Subject to any disclaimer, the term of this patent is extended or adjusted under 35 U.S.C. 154(b) by 6 days.

(21) Appl. No.: 10/028,212

(22) Filed: Dec. 21, 2001

(65) Prior Publication Data

US 2002/0087239 A1 Jul. 4, 2002

(30) Foreign Application Priority Data

Dec. 30, 2000 (KR) ........................................ 2000-87035

(51) Int. Cl.[7] .............................................. G06F 7/00
(52) U.S. Cl. ............................. 701/34; 701/29; 701/62; 701/63; 701/64; 477/906; 477/125; 477/126
(58) Field of Search .............................. 701/29, 34, 51, 701/56, 62, 63, 64, 65; 74/335, 336 R; 73/118.1, 117.3; 340/438, 456; 475/158, 127; 477/906, 97, 121, 125, 126; 702/183

(56) References Cited

U.S. PATENT DOCUMENTS

| | | | | |
|---|---|---|---|---|
| 4,849,899 A | * | 7/1989 | Cote et al. ..................... | 701/63 |
| 5,027,647 A | * | 7/1991 | Shimanaka ................. | 73/118.1 |
| 6,022,293 A | * | 2/2000 | Dourra et al. .............. | 477/158 |
| 6,055,475 A | | 4/2000 | Moriyama .................... | 701/56 |
| 6,086,512 A | * | 7/2000 | Kondo ........................ | 477/125 |
| 2002/0082132 A1 | * | 6/2002 | Jeon .......................... | 475/158 |

* cited by examiner

Primary Examiner—Jacques H. Louis-Jacques
(74) Attorney, Agent, or Firm—Pennie & Edmonds LLP

(57) ABSTRACT

A fault diagnosis method is provided in which it is possible to determine whether the input shaft speed sensor of the automatic transmission is faulty by using the signals of the output shaft speed sensor, the brake switch, the engine speed sensor and so on, without making use of the signal of the vehicle speed sensor. Moreover, even if there are faults in the output shaft speed sensor or if the shift lever is positioned in the parking P range or the neutral N range, or if the engine speed is lower than the stall speed, the fault diagnosis method for the input shaft speed sensor can be performed, and additionally, a possibility of a misjudgment caused by a bad N-D hydraulic pressure response at an extremely low temperature can be removed.

11 Claims, 4 Drawing Sheets

FAULT DIAGNOSIS METHOD FOR AN INPUT SHAFT SPEED SENSOR OF AN AUTOMATIC TRANSMISSION

BACKGROUND OF THE INVENTION

The present invention relates to a fault diagnosis method for an input speed sensor of an automatic transmission for a vehicle, and more particularly, to a method that makes it possible to diagnose a fault of the input speed sensor of a vehicle without a vehicle speed sensor when a shift lever is positioned not only in forward running ranges, but also in non-running ranges, and also when the vehicle is operating at a low engine speed.

RELATED PRIOR ART

Generally, an ECU (Electronic Control Unit) generates a fault diagnosis code for indicating faults in an engine control process and units thereof on the basis of a vehicle state that is detected by several sensors, such as a vehicle speed sensor and an engine speed sensor.

FIG. 1 schematically shows signal processing executed by the ECU.

As shown in FIG. 1, a sensing means for detecting data on a vehicle state comprises a vehicle speed sensor 11 detecting a vehicle speed, an inhibitor switch 12 detecting a shift lever position, an oil temperature sensor 13 detecting an automatic transmission fluid temperature, a brake switch 14 detecting a brake pedal application, an engine speed sensor 15 detecting an engine speed, an input shaft speed sensor 17 detecting an input shaft speed of a transmission, and an output shaft speed sensor 18 detecting an output shaft speed of the transmission.

An ECU 20 determines driving conditions or a vehicle state by a predetermined control logic or diagnosis logic on the basis of data detected by the above sensing means, and generates a diagnosis code for the units that are malfunctioning.

If there are malfunctioning units, the ECU 20 outputs an error code that is allotted to each malfunctioning unit and informs a driver of the fault by lighting an MIL (Malfunction Indication Lamp) 30.

The ECU 20 determines whether the input shaft speed sensor 17 is malfunctioning by diagnosing an output signal of the input shaft speed sensor when a forward running range signal is input from the inhibitor switch 12 and a vehicle speed detected by the vehicle speed sensor 11 is higher than a predetermined speed. If the signal of the input shaft speed sensor 17 is not present, the ECU determines that the input shaft speed sensor is malfunctioning. The forward running range is D, 3, 2, L, sports mode, or the like.

Also, the ECU 20 determines whether the input shaft speed sensor 17 is malfunctioning by diagnosing a signal of the input shaft speed sensor when the forward running range signal is input from the inhibitor switch 12, and an engine speed is higher than an engine stall RPM. If the signal of the input shaft speed sensor is not present, the ECU determines that the input shaft speed sensor is malfunctioning.

However, in the aforementioned systems, the ECU determines whether the input shaft speed sensor is malfunctioning on the basis of the vehicle speed sensor signal. Therefore, if the vehicle speed sensor is removed, the fault diagnosis method for the input shaft speed sensor cannot be realized. Recently, there has been a tendency to remove the vehicle speed sensor, thus leading to difficulties.

In addition, because it is possible to diagnose a fault of the input shaft speed sensor only when the shift lever is positioned in the forward running range in the prior art, the fault diagnosis method cannot be performed in an N range or a P range.

In case the ECU determines the fault of the input shaft speed sensor on the basis of the engine speed signal, the ECU detects whether the input shaft speed sensor is malfunctioning only when the engine speed is higher than the stall RPM because there is a possibility of a misjudgment in the engine stall state. Therefore, in a specific engine RPM range the fault diagnosis becomes impossible.

SUMMARY OF THE INVENTION

The present invention provides a fault diagnosis method in which the fault of the input shaft speed sensor of a vehicle without a vehicle speed sensor can be diagnosed even when the gearshift lever is not positioned in the forward running range or the engine speed is low. According to a preferred embodiment, the present invention comprises (a) determining whether a shift lever is positioned in a forward running range based on a signal of an inhibitor switch, (b) determining whether the input shaft speed sensor works properly by reading a first-state flag if the shift lever is determined to be not positioned in the forward running range, (c) determining whether the shift lever is positioned in a P range or an N range based on the signal of the inhibitor switch if the input shaft speed sensor works properly, (d) determining whether an automatic transmission fluid temperature is higher than a predetermined critical temperature if the shift lever is positioned in the P range or the N range, and (e) separately determining whether the input shaft speed sensor is faulty according to whether a turbine speed is higher than a predetermined first critical speed, if the temperature of the automatic transmission fluid is higher than the predetermined critical temperature.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Hereinafter, a preferred embodiment of the present invention will be described in detail with reference to the accompanying drawings.

Figure 1:
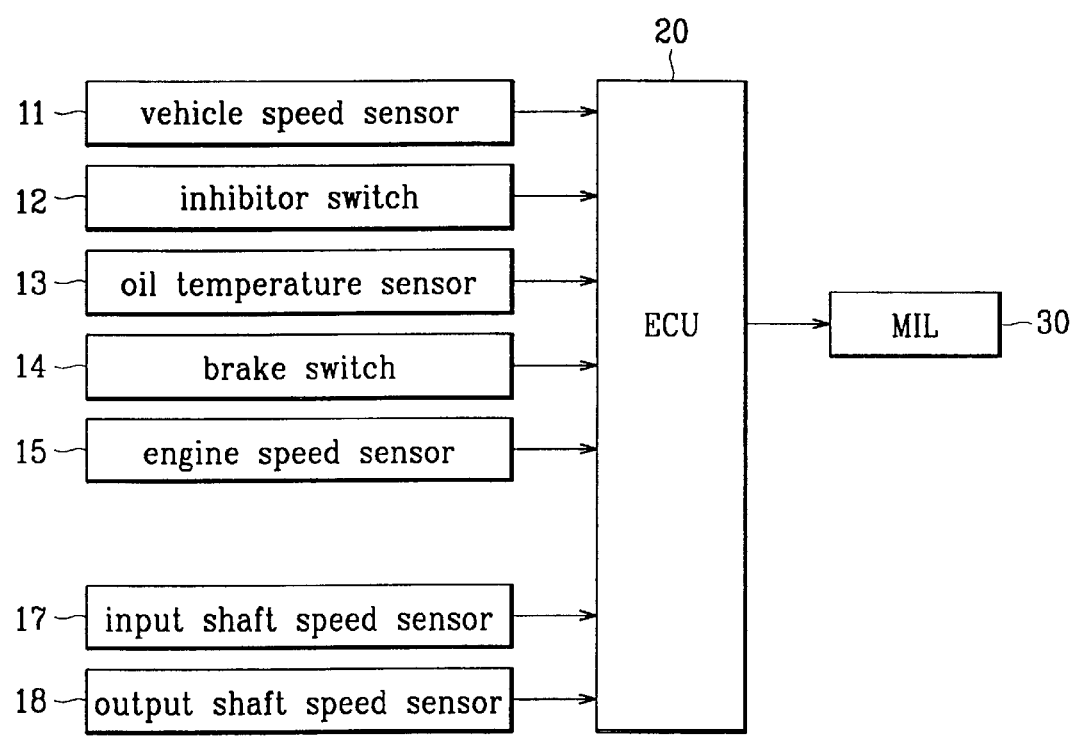
FIG. 1 is a system to which the fault diagnosis method of the present invention can be applied.
Figure 2A:
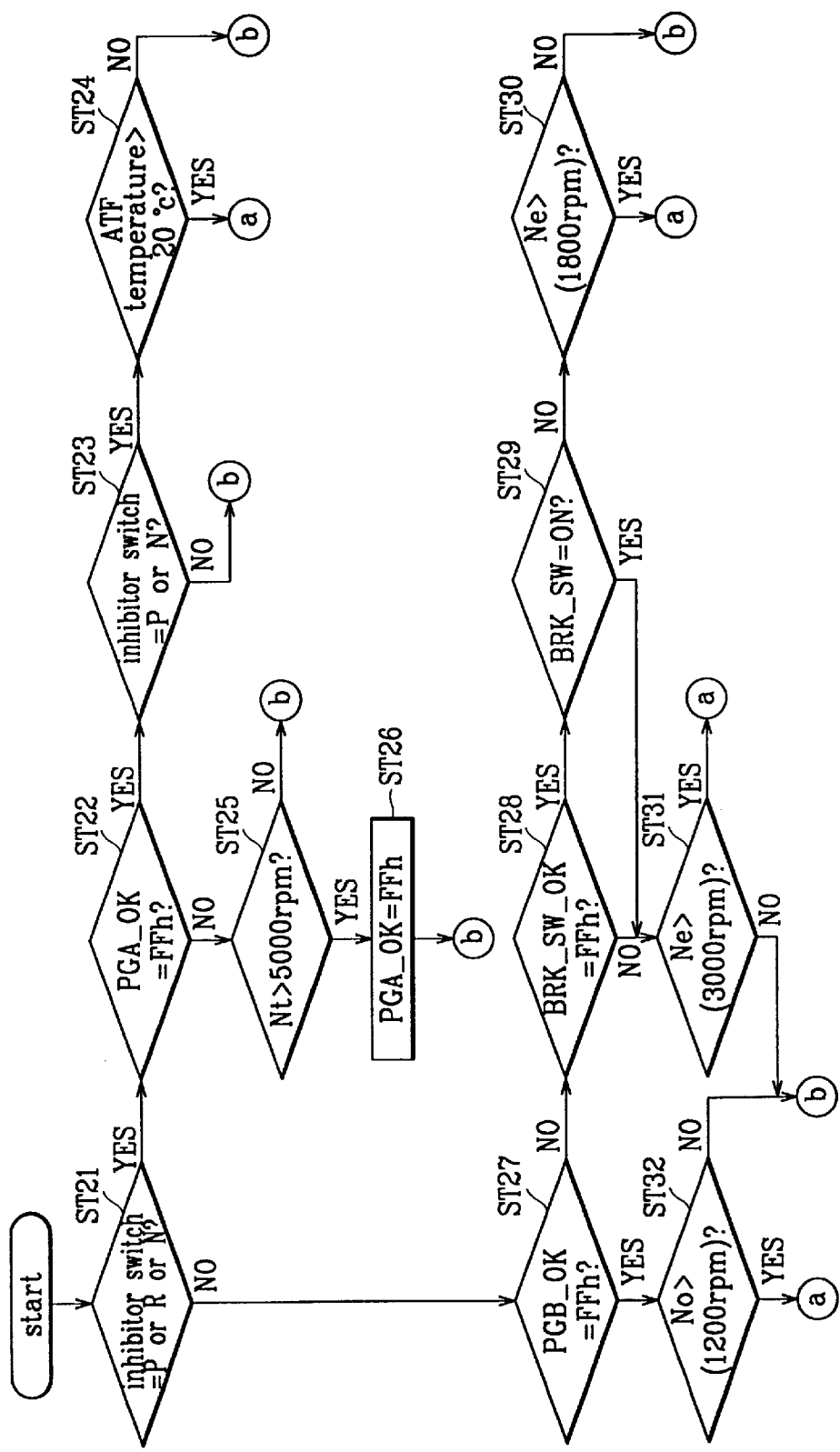
FIGS. 2a and 2b are flow charts showing a fault diagnosis method according to the preferred embodiment of the present invention.

Referring to FIGS. 1 and 2, the input shaft speed sensor 17 and the output shaft speed sensor 18 can be respectively realized by a PG-A sensor and a PG-B sensor. The ECU 20 determines, by using a signal that is input from the inhibitor switch 12, whether the shift lever is positioned in a forward running range. The forward running range indicates all ranges except the parking P, reverse R and neutral N ranges (ST21).

If it is determined that the shift lever is not positioned in the forward running range, the ECU determines whether the input shaft speed sensor 17 works properly (ST22).

A fault of the input shaft speed sensor is determined, not by comparing the input shaft speed with the vehicle speed detected by the vehicle speed sensor, but based on a predetermined first-state flag PGA_OK that indicates a state of the input shaft speed sensor 17.

Preferably, the first-state flag PGA_OK is set to have a value of 'FFh' when the input shaft speed sensor works properly, and the value that is stored in the flag is canceled when an ignition key is turned off.

The first-state flag is stored in a storage device, such as a memory, such that the ECU 20 can access the first-state flag at any time. Thus, the ECU 20 can find a value that is stored in the first-state flag by reading the memory.

If the input shaft speed sensor 17 is not faulty in step ST22 (that is, PGA_OK=FFH), the ECU 20 determines whether the shift lever is positioned in the parking P range or the neutral N range based on the signal of the inhibitor switch 12 (ST23). If the shift lever is determined to be positioned in the parking P range or the neutral N range in step ST23, the ECU 20 detects the temperature of the automatic transmission fluid (ATF) by using an oil temperature signal, and it determines whether the temperature is higher than a predetermined critical temperature (ST24). Preferably, the predetermined critical temperature can be set as 20° C. If the ATF temperature is higher than the predetermined critical temperature, the procedure advances to (a) in FIG. 2B.

On the other hand, if the input shaft speed sensor 17 is determined to be faulty in step ST22, the ECU determines whether a turbine speed (Nt) is higher than a predetermined fifth critical speed (ST25). Preferably, the predetermined fifth critical speed can be set at about 5000 RPM. If the turbine speed Nt is determined to be higher than the predetermined fifth critical speed in step ST25, the PGA_OK is allotted the value FFh (ST26).

Figure 2B:
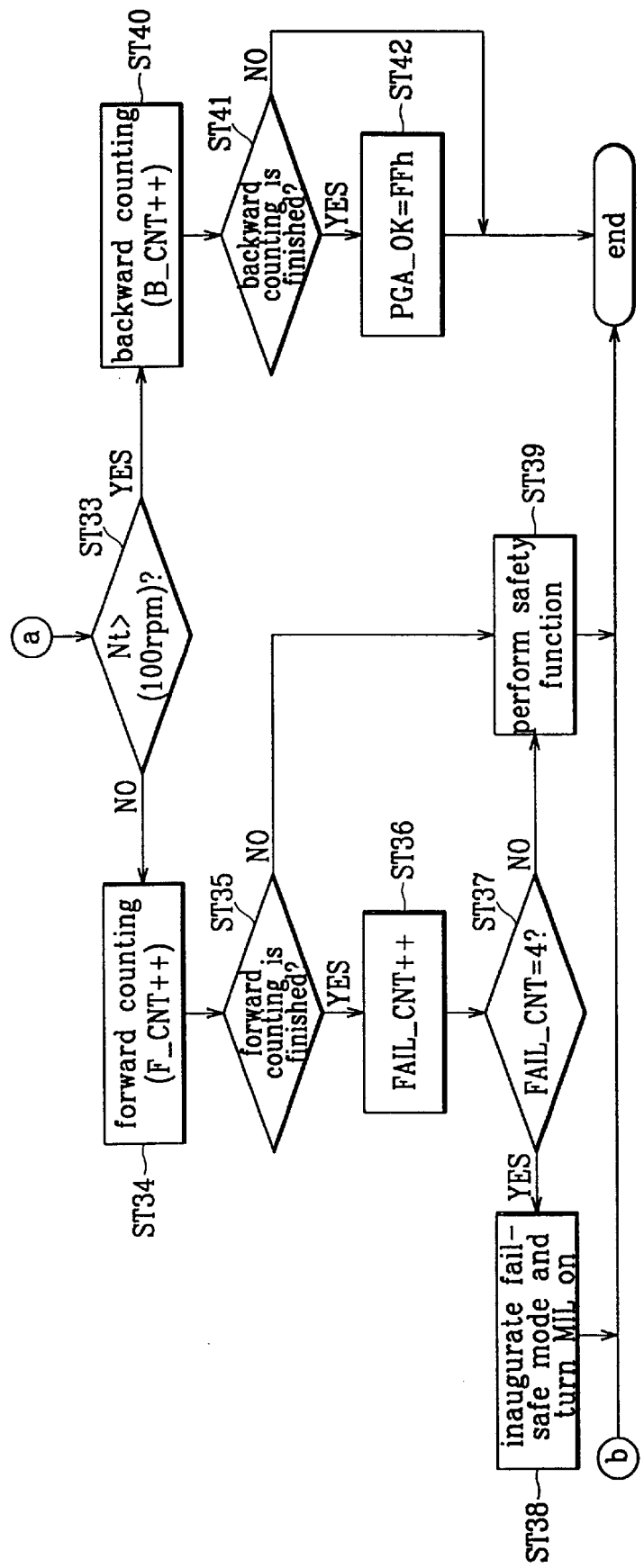

If the shift lever is determined to be positioned neither in the P range nor in the N range in step ST23, if the ATF temperature is determined to be not higher than the predetermined critical temperature in step ST24, if the turbine speed Nt is determined to be not higher than the predetermined fifth critical speed, or if step ST26 is performed, the procedure advances to (b) in FIG. 2B.

On the other hand, if the shift lever is determined to be positioned in a forward running range in step ST21, the ECU 20 reads a second-state flag PGB_OK that indicates whether the output shaft speed sensor is faulty and determines therewith whether the output shaft speed sensor 18 works properly (ST27). If the output shaft speed sensor works properly, a value stored in the PGB_OK is equal to FFh.

If the output shaft speed sensor 18 is determined to work properly in step ST27 (that is, PGB_OK=FFh), the ECU determines whether an output shaft speed No is higher than a predetermined fourth critical speed (ST32). Preferably, the predetermined fourth critical speed can be set at 1200 RPM. If the output shaft speed is determined to be higher than the predetermined fourth critical speed in step ST32, the procedure advances to (a) in FIG. 2B. Contrarily, if the output shaft speed is determined to be not higher than the predetermined fourth critical speed in step ST32, the procedure advances to (b) in FIG. 2B.

On the other hand, if the output shaft speed sensor is determined to be faulty in step ST27, the ECU 20 determines whether a brake switch 14 works properly by using a third-state flag BRK_SW_OK that so indicates (ST28). If the brake switch 14 works properly, a value stored in the third-state flag BRK_SW_OK is 'FFh'. The ECU determines whether the brake switch is faulty by a predetermined control logic. If the brake switch is determined to work properly in step ST28, the ECU 20 determines whether the brake switch is turned on by using a fourth-state flag BRK_SW that so indicates (ST29). If the brake switch is turned on, a value stored in the fourth-state flag is 'ON'. If the brake switch is determined to be not turned on in step ST29, the ECU 20 determines whether an engine speed detected by the engine speed sensor 15 is higher than a predetermined third critical speed (ST30). Preferably, the predetermined third critical speed can be set at 1800 RPM. If the brake switch is determined to be faulty in step ST28, or if the brake switch is determined to be turned on in step ST29, the ECU determines whether the engine speed Ne is higher than a predetermined sixth critical speed (ST31). Preferably, the predetermined sixth critical speed can be set at 3000 RPM.

If the engine speed Ne is determined to be higher than the predetermined third critical speed in step ST30, or if the engine speed Ne is determined to be higher than the predetermined sixth critical speed in step ST31, the procedure advances to (a) in FIG. 2B. Contrarily, if the engine speed is determined to be not higher than the predetermined third critical speed in ST30, or if the engine speed is determined to be not higher than the predetermined sixth critical speed in step ST31, the procedure advances to (b) in FIG. 2B.

After (a) in FIG. 2B, the procedure advances to step ST33, where the ECU determines whether a turbine speed Nt is higher than a predetermined first critical speed. Preferably, the predetermined first critical speed can be set at 100 RPM. If the turbine speed Nt is determined to be not higher than the predetermined first critical speed in step ST33, the ECU 20 determines that the input shaft speed sensor fault is present and adds one to a flag F_CNT that indicates a number of fault diagnoses (ST34).

Figure 3:
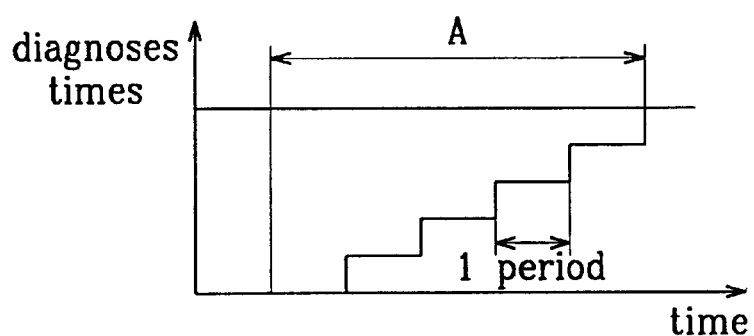
FIG. 3 is a graph showing a method for obtaining fault duration.

After step ST34 is performed, the ECU 20 determines whether the fault duration is longer than the predetermined time period. As shown in FIG. 3, the fault duration 'A' is obtained by multiplying the F_CNT by a diagnosis cycle period. If the fault duration is longer than the predetermined time period, it is determined that forward counting is finished (ST35). That is, if the sensor fault lasts over the predetermined time period, the ECU determines the sensor is faulty.

If the forward counting is determined to be finished in step ST35, the ECU adds one to FAIL_CNT (ST36). The FAIL_CNT indicates the number of times the ECU determines the sensor to be faulty. Then, the ECU 20 determines whether the FAIL_CNT is equal to a predetermined critical number (ST37). Preferably, the predetermined critical number can be set as 4. If the FAIL_CNT is determined to be equal to 4 in step ST37, the ECU inaugurates a fail-safe mode and turns the MIL (Malfunction Indication Lamp) on such that the driver can recognize the fault of the input shaft speed sensor (ST38).

If the forward counting is determined to be not finished in step ST35, or if the FAIL_CNT value is smaller than the predetermined critical number in step ST37, the ECU 20 performs a suitable safety function in accordance with the FAIL_CNT without informing the driver of the fault (ST39).

After steps ST38 and ST39 are executed, the procedure ends and returns to a main routine.

On the other hand, if the turbine speed is higher than the predetermined first critical speed in step ST33, the ECU determines that the input shaft speed sensor fault is not present. The ECU 20 adds one to a flag B_CNT value that indicates the number of 30 non-fault diagnoses (ST40). After step ST40 is executed, the ECU 20 determines whether a non-fault duration is longer than a predetermined time period. If the non-fault duration is longer than the predetermined time period, it is determined that backward counting is finished (ST41). If the backward counting is determined to be finished in step ST41, the ECU 20 allots 'FFh' to the PGA_OK value (ST42). If the backward counting is determined to be not finished in step ST41, the procedure ends and returns to the main routine.

On the other hand, if the procedure advances to (b) in FIG. 2B, the ECU 20 determines that conditions for the fault diagnosis are not fulfilled and the procedure ends and returns to the main routine.

According to the aforementioned fault diagnosis method, it is possible to determine whether the input shaft speed sensor of the automatic transmission is faulty, by using the signals of the output shaft speed sensor, the brake switch, the engine speed sensor and so on, without making use of the signal of the vehicle speed sensor. Moreover, even if there are faults in the output shaft speed sensor or the shift lever is positioned in the P range or the N range, or if the engine speed is lower than the stall speed, the fault diagnosis method for the input shaft speed sensor can be available. In addition to the above, a possibility of a misjudgment caused by a bad N-D hydraulic pressure response at an extremely low temperature can be removed.

Although a preferred embodiment of the present invention has been described in detail hereinabove, it should be clearly understood that many variations and/or modifications of the basic inventive concepts herein taught which may appear to those skilled in the present art will still fall within the sprit and scope of the present invention, as defined in the appended claims.

What is claimed is:

1. A fault diagnosis method for an input shaft speed sensor of an automatic transmission comprising:
    (a) determining whether a shift lever is positioned in a forward running range based on a signal of an inhibitor switch;
    (b) determining whether the input shaft speed sensor works properly by reading a first state flag if the shift lever is determined to be not positioned in a forward running range, and determining whether the shift lever is positioned in a parking P range or a neutral N range;
    (c) determining whether an automatic transmission fluid temperature is higher than a predetermined critical temperature if the shift lever is positioned in the parking P range or the neutral N range; and
    (d) separately determining whether the input shaft speed sensor is faulty according to whether a turbine speed is higher than a predetermined first critical speed, if the temperature of the automatic transmission fluid is higher than the predetermined critical temperature.

2. The method of claim 1 wherein if the turbine speed is determined to be not higher than the predetermined first critical speed in step (d), step (d) comprises:
    determining whether a fault duration is longer than a predetermined time period;
    counting a number of fault diagnoses if the fault duration is determined to be longer than the predetermined time period;
    determining whether the number of fault diagnoses is equal to predetermined number; and
    informing a driver of the fault if the number of fault diagnoses is equal to the predetermined number, otherwise performing a safety function without informing the driver of the fault.

3. The method of claim 1 wherein if the turbine speed is determined to be higher than the predetermined first critical speed in step (d), step (d) comprises;
    determining whether a non-fault duration is longer than a predetermined time period; and
    determining that the input shaft speed sensor is not faulty and renewing the first flag as a value indicating normal state of the input shaft speed sensor if the non-fault duration is longer than the predetermined time period.

4. The method of claim 1 wherein if the input shaft speed sensor is determined to be faulty in step (b), the method further comprises:
    determining whether the turbine speed is higher than a predetermined fifth critical speed; and
    renewing the first state flag with a value indicating normal state of the input shaft speed sensor if the turbine speed is determined to be higher that the fifth critical speed.

5. The method of claim 1 wherein if the shift lever is determined to be positioned in the forward running range in step (a), the method further comprises:
    determining whether an output shaft speed sensor works properly by reading a second-state flag if the shift lever is determined to be positioned in the forward running range; and
    determining whether an output shaft speed is higher than a predetermined fourth critical speed if the output shaft speed sensor works properly.

6. The method of claim 5 wherein if the transmission output shaft speed sensor is determined not to work properly, the method further comprises:
    determining whether a brake switch works properly by reading a third-state flag;
    determining whether the brake switch is turned on if the brake switch works properly; and
    determining whether an engine speed is higher than a predetermined third critical speed if the brake switch is determined to be not turned on.

7. The method of claim 6 wherein if the brake switch is determined to not work properly, or if the brake switch is determined to be turned on, the method further comprises the steps of determining whether the engine speed is higher than a predetermined sixth critical speed.

8. A fault diagnosis method for an input shaft speed sensor for an automatic transmission comprising:
    (a) determining whether a shift lever is positioned in a forward running range based on a signal of an inhibitor switch;
    (b) determining whether the input shaft speed sensor works properly by reading a first state flag if the shift lever is determined to be not positioned in a forward running range;
    (c) determining whether the shift lever is positioned in a parking P range or a neutral N range if it is determined that the input shaft speed sensor works properly;
    (d) determining whether an automatic transmission fluid temperature is higher than a predetermined critical temperature if the shift lever is determined to be positioned in the parking P range or the neutral N range;
    (e) determining whether the turbine speed is higher than a predetermined fifth critical speed if the input shaft speed sensor is determined to be faulty in step (b);

(f) renewing the first state flag with a value indicating normal state of the input shaft speed sensor if the turbine speed is determined to be higher that the fifth critical speed in step (e);

(g) determining whether an output shaft speed sensor works properly by reading a second-state flag if the shift lever is determined to be positioned in the forward running range in step (a);

(h) determining whether an output shaft speed is higher than a predetermined fourth critical speed if the output shaft speed sensor works properly in step (g);

(i) determining whether a brake switch works properly by reading a third-state flag if the transmission output shaft speed sensor is determined not to work properly in step (g), determining whether the brake switch is turned on if the brake switch works properly, and determining whether an engine speed is higher than a predetermined third critical speed if the brake switch is determined to be not turned on;

(j) determining whether the engine speed is higher than a predetermined sixth critical speed if the brake switch is determined to not work properly, or if the brake switch is determined to be turned on; and (k) separately determining whether the input shaft speed sensor is faulty according to whether a turbine speed is higher than a predetermined first critical speed, if the temperature of the automatic transmission fluid is determined to be higher than the predetermined critical temperature in step (d), if the output shaft speed is determined to be higher than the predetermined fourth critical speed in step (h), if the engine speed is determined to be higher than the predetermined third critical speed in step (i), or if the engine speed is determined to be higher than the predetermined sixth critical speed in step (j).

9. The method of claim 8 wherein if the turbine speed is determined to be not higher than the predetermined first critical speed in step (k), the step (k) comprises:

determining whether a fault duration is longer than a predetermined time period;

counting a number of fault diagnoses if the fault duration is determined to be longer than the predetermined time period;

determining whether the number of fault diagnoses is equal to predetermined number; and informing a driver of the fault if the number of fault diagnoses is equal to the predetermined number, otherwise performing a safety function without informing the driver of the fault.

10. The method of claim 8 wherein if the turbine speed is determined to be higher than the predetermined first critical speed in step (k), the step (k) comprises;

determining whether a non-fault duration is longer than a predetermined time period; and determining that the input shaft speed sensor is not faulty and renewing the first flag as a value indicating normal state of the input shaft speed sensor if the non-fault duration is longer than the predetermined time period.

11. The method of claim 8 wherein if the shift lever is determined to be positioned neither in the parking P range nor in the neutral N range in step (c), if the automatic transmission fluid temperature is determined not to be higher than the predetermined critical temperature in step (d), if the turbine speed is determined not to be higher than the fifth critical speed in step (e), if step (f) is performed, if the output shaft speed is determined not to be higher than the predetermined fourth critical speed in step (h), if the engine speed is determined not to be higher than the predetermined third critical speed in step (i), or if the engine speed is determined not to be higher than the predetermined sixth critical speed in step (j), the procedure ends.

\* \* \* \* \*